United States Patent Office 3,074,865
Patented Jan. 22, 1963

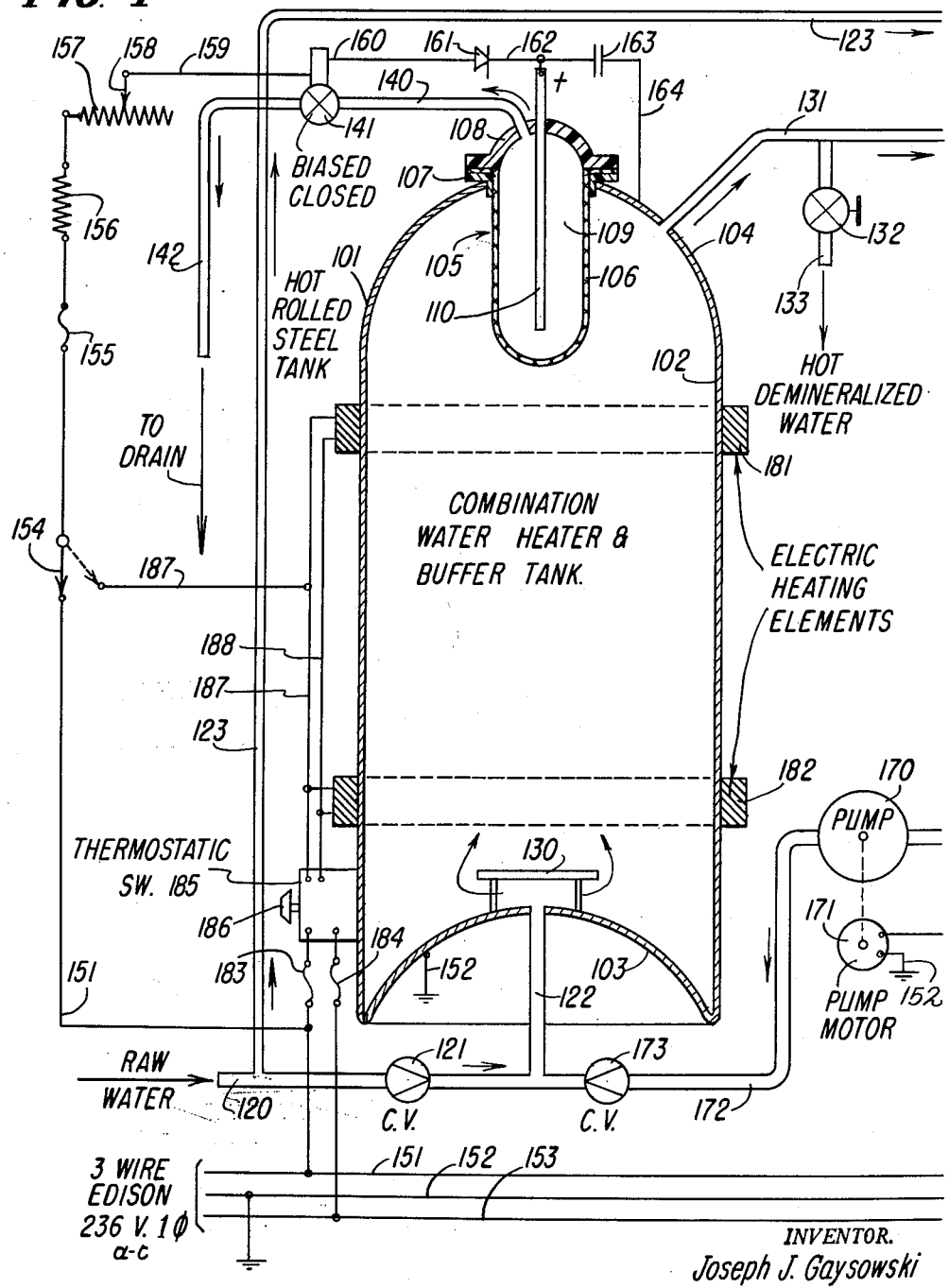

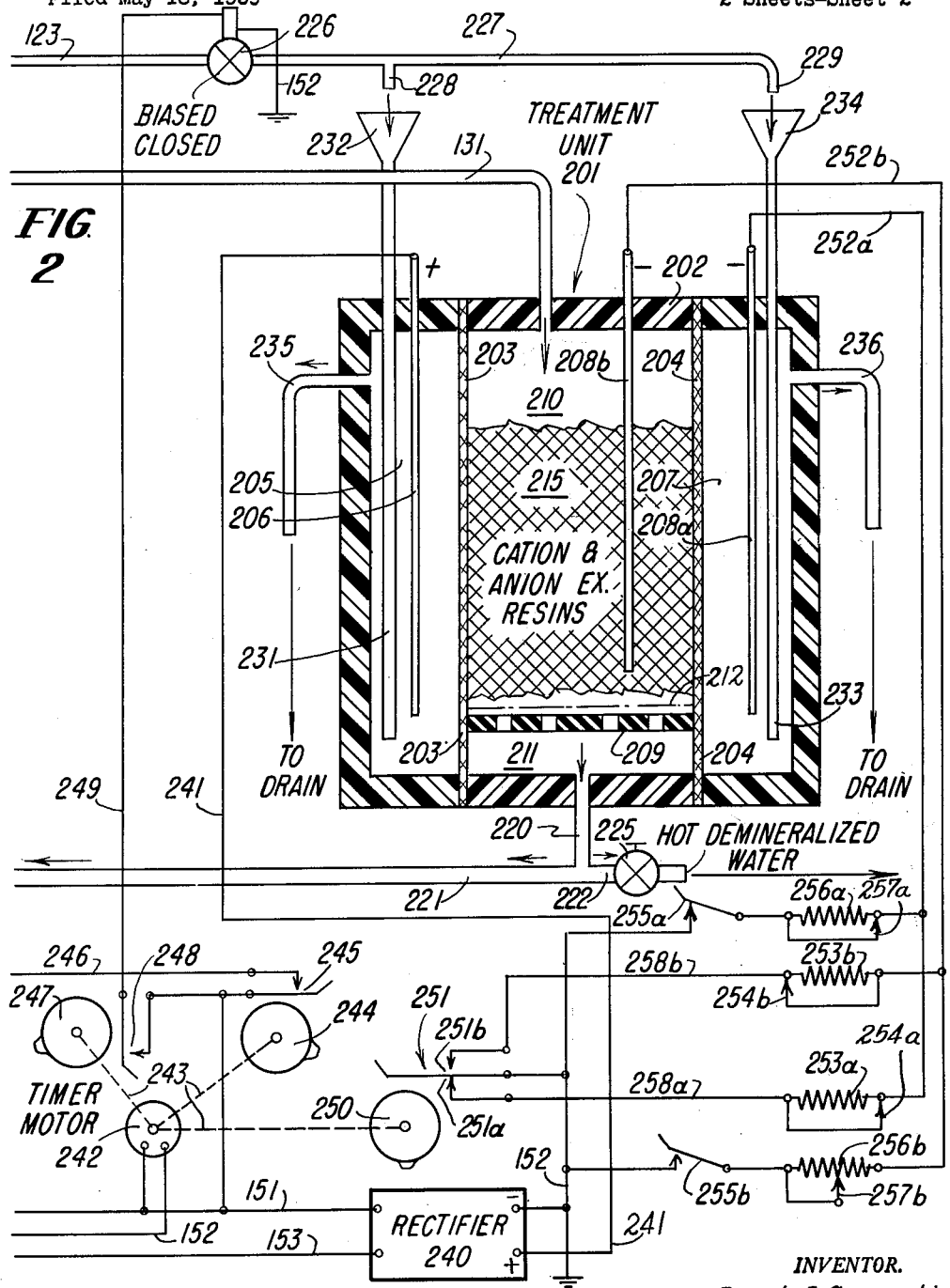

3,074,865
METHODS OF AND APPARATUS FOR DE-
MINERALIZING RAW WATER
Joseph J. Gaysowski, Chicago, Ill., assignor to General
Electric Company, a corporation of New York
Filed May 18, 1959, Ser. No. 813,842
19 Claims. (Cl. 204—151)

The present invention relates to water demineralizing methods and apparatus, and particularly to such methods and apparatus employing an electrodialysis unit operable to increase the pH of the treated water and a water treatment unit involving both ion exchange and electrodialysis.

It is a general object of the invention to provide an improved method and apparatus of the character noted, employing electrodialysis and containing structure to pass a direct current whereby selectively to withdraw anions from the water being treated, so that the pH thereof is raised to minimize corrosion of the water storage tank and other metallic parts that come in contact with the treated water.

Another object of the invention is to provide in a water storage tank a method and apparatus for selectively removing anions from the water therein, so as to raise the pH of the water and thus provide protection for materials which come into contact with the treated water.

A further object of the invention is to provide in a method and apparatus of the character noted, an improved arrangement for passing current through the electrodialysis cell so that the anolyte solution therein is selectively flushed and periodically removed and renewed in accordance with the concentration of the anions therein, whereby to minimize the amount of treated water utilized to flush the anolyte therefrom and to minimize back migration of removed anions from the electrodialysis cell into the treated water.

Another object of the invention is to provide an improved method and apparatus of the character noted, employing a water treatment unit having therein an ion exchange resin bed characterized by both cation exchange centers and anion exchange centers, the water treatment unit containing structure to pass a direct current through the resin bed to regenerate the bed by means of electrodialysis, and an arrangement for substantially matching the regenerating rates of the cation exchange centers and the anion exchange centers, so that following a draw-off of demineralized water from the system, substantially equal recovery or regeneration of the cation exchange centers and anion exchange centers takes place during a given recovery time interval.

Another object of the invention is to provide in a method and apparatus of the character noted, an improved arrangement of applying the regenerating current to the resin bed so that the rates of degeneration of the cation exchange centers and the anion exchange centers thereof are substantially matched and so that the rates of regeneration thereof are substantially matched, with the result that the regeneration states of the cation exchange centers and the anion exchange centers are always substantially equal in order to avoid changing the pH of the water passing through the demineralizing unit.

A further object of the invention is to provide in a method and apparatus of the character noted an improved arrangement for regenerating the ion exchange resin, wherein the cation exchange centers and the anion exchange centers have substantially equal total ion exchange capacities in total grains of dissolved solids that can be extracted from the raw water between regenerations of the bed.

Another object of the invention is to provide in a method and apparatus of the character noted, an improved circulating system involving an ion exchange treatment unit and a buffer tank so as to limit the degeneration of the ion exchange resin incorporated in a system incident to a draw-off of demineralized water therefrom, so that the recovery time interval of the ion exchange resin is reduced to a substantial minimum, and further wherein an electrodialysis unit is provided in the buffer tank selectively to remove anions therefrom to increase the pH of the water prior to admission to the ion exchange unit, whereby to reduce corrosion in the circulating system.

A further object of the invention is to provide an improved method and apparatus of the character noted, including an electrodialysis unit associated with a hot water storage tank and operable selectively to remove anions from the water within the storage tank to decrease corrosion thereof.

A still further object of the invention is to provide in a method and apparatus of the character noted, an electrodialysis unit in combination with a hot water heater, wherein an improved arrangement for applying the operating current to the electrodialysis unit is provided in combination with the heaters for the hot water tank, whereby the electrodialysis unit is operated when the heaters are operated.

Further features of the invention pertain to the particular arrangements of the steps of the methods and of the elements of the apparatus whereby the above-outlined and additional operating features thereof are attained.

The invention both as to its organization and method of operation, together with further objects and advantages thereof, will best be understood by reference to the following specification taken in combination with the accompanying drawings in which:

FIGURE 1 is a diagrammatic illustration of a water storage tank embodying the present invention and the control apparatus and circuits for controlling the operation thereof, and in which the method of the present invention is carried out; and FIG. 2 is a diagrammatic illustration of a water demineralizing apparatus embodying the present invention and the control apparatus and circuits for controlling the operation thereof, and in which the method of the present invention is carried out.

At the outset, it is noted that the present invention is predicated upon the discovery that in the storage of raw acid waters, the pH thereof can be satisfactorily raised by selectively removing the anions therefrom by means of electrodialysis, the increase in the pH reducing the attack of the acid water upon metal parts in contact therewith, and further when the pH is raised above 7 there is formed on the metal surfaces in contact therewith a further protective coating produced by precipitation of calcium and magnesium ions and more specifically salts thereof on the metal surfaces. Only a relatively small amount of anions need be extracted when treating most raw waters to obtain alkaline water and thus to protect both the storage tank and the entire piping system associated therewith.

The present invention is further predicated upon the discovery that the performance characteristics of a water demineralizing system embodying electrodemineralizing apparatus involving both ion exchange and electrodialysis can be drastically improved by applying the regenerating current to the removal of anions substantially continuously while intermittently applying or varying the regenerating current to the removal of cations so that the recovery or regenerating rates of the anion and cation exchange centers of the resins employed can be selectively varied to obtain a substantial match therebetween. This improved method and apparatus takes advantage of the peculiar recovery characteristics of the ion exchange resins wherein the cations in general migrate at a faster rate through the bed of ion exchange resin than do the anions under the application of the same regenerating current whereby in two comparable anion exchange and cation exchange resins have approximately the same ion exchange capacities and at substantially the same state of regeneration, the cation exchange resin will be regenerated substantially faster than the anion exchange resin. As a result the cation exchange resin has a relatively low apparent specific resistance and the anion exchange resin has a relatively high apparent specific resistance, the ratio between the two specific resistances mentioned being about 1:2. Accordingly, following the unit degeneration of the two resins and with the same direct voltage applied between the anodes and cathodes associated therewith, the regenerating current through the cation exchange resin is about three times that through the anion exchange resin, whereby to pass the required coulombs to effect substantially equal regenerations of the two resins, whereby approximately one unit of time is required for regeneration of the cation exchange resin and approximately three units of time are required for regeneration of the anion exchange resin. Moreover, these time intervals become further disproportional in the event of the degeneration of the resins in excess of one unit, due to the normal recovery rates of the resins; whereby the state of generation of the cation exchange resin frequently becomes substantially higher than that of the anion exchange resin, in the event of an excess draw-off of demineralized water from the system, with the result that in the subsequent draw-off "acid water" is obtained, as the cation exchange resin is far more effective than the anion exchange resin.

Now it has been discovered that the time interval required to effect the complete regeneration of the cation exchange centers in a bed can be substantially matched to the time interval required to effect the complete regeneration of the anion exchange centers in the bed by providing an anode in a body of anolyte contacting the bed and a first cathode in a body of catholyte contacting the bed and a second cathode in the bed, and selectively applying potential between the anode and the first and second cathodes, whereby the application of potential between the anode and the first cathode nonconcurrently with the application of potential between the anode and the second cathode effects substantial displacements both of sorbed anions from the bed into the anolyte and of sorbed cations from the bed into the catholyte, and whereby the application of potential between the anode and the cathode either concurrently or nonconcurrently with the application of potential between the anode and the first cathode effects substantial displacement only of sorbed anions from the bed into the anolyte.

Referring now to FIGS. 1 and 2 of the drawings, the demineralizing apparatus there illustrated and embodying the features of the present invention and in which the method of the present invention is carried out, is specifically designed for home use, and essentially comprises a water storage tank 101, a treatment unit 201, a raw water supply pipe 120, a first demineralized or treated water supply pipe 133, and a second demineralized or treated water supply pipe 222. The raw water in the raw water supply pipe 120 is under pressure and is connected to the city water main, not shown; while the first demineralized water supply pipe 133 is normally connected through a first manually operable supply valve 132 to points of use requiring large volumes of water but demanding less highly demineralized water and the second demineralized water supply pipe 222 is normally connected through a second manually operable supply valve 225 to points of use requiring a smaller volume of demineralized water but demanding highly demineralized water, the points of use ordinarily being positioned in the home but not being shown. The raw water in the supply pipe 120 contains substantial amounts of dissolved mineral salts supplying thereto such cations as: $Ca^{++}$, $Mg^{++}$, $Fe^{++}$, $Na^+$, $K^+$, etc., and such anions as: $HCO_3^-$, $SO_4^{--}$, $Cl^-$, $CO_3^{--}$, etc. Moreover, this raw water may be quite hard and may have a total dissolved solids content as high as about 70 grains per gallon (1200 p.p.m.). In the operation of the system 100, the raw water is demineralized, whereby the demineralized or treated water delivered to the supply pipes 133 and 222 has a total dissolved solids content not in excess of 3 grains per gallon (51 p.p.m.).

Fundamentally, the storage tank 101 comprises an outer cylindrical shell or body 102 which may be formed preferably of hot rolled steel as are all other parts of the tank 101, a bottom header 103, and a top header 104. The upper portion of the header 104 has mounted therein an electrodialysis unit 105 including a ceramic chamber or wall 106 disposed within the tank 101 and electrically insulated therefrom by an insulating gasket 107 and cooperating with the header 104 to form an anolyte chamber 109. The ceramic chamber 106 is porous whereby water and ions therein can pass therethrough, the chamber being formed for example of porous aluminum silicate or porous aluminum oxide. The ceramic chamber 106 will therefore be resistant to elevated temperatures when the tank 101 is also used as a water heater, as will be explained hereafter, and the chamber 106 is electrically non-conductive and further is resistant to attack by acid solutions which will be formed in the anolyte chamber 109 therein during operation of the electrodialysis unit 105. A plastic fitting or cover 108 is provided to close the upper end of the chamber 106, the cover 108 being formed of electrical insulating material and receiving therethrough and mounting therein an anode 110 which may be formed of platinized tungsten, titanium, or other suitable material.

Raw water to be treated is supplied to the bottom of the tank 101 from the raw water supply pipe 120 through a check valve 121 and a connecting conduit 122, the check valve 121 permitting flow only from the pipe 120 into the conduit 122. Raw water is also supplied to flush the anolyte and catholyte chambers of the treatment unit 201 as will be described more fully hereafter, raw water being supplied for this purpose from the pipe 120 through a connecting conduit 123.

The header 104 is provided with an outlet pipe 131 which delivers water to be treated to the treatment unit 201 for further treatment. The water within the tank 101 also is used to flush and renew the anolyte in the chamber 109 of the electrodialysis unit 105, the cover 108 being provided with a conduit 140 having a solenoid valve 141 therein communicating with a second conduit 142 that empties into the drain. The valve 141 is normally closed and is of the marginal type wherein the solenoid is actuated to open the valve only when the current through the solenoid coil rises to a predetermined value and further the valve is closed when the current through the valve falls to another predetermined value.

The electrodialysis unit 105 is electrically operated and, accordingly, the demineralizing system further comprises a source of electrical power of 236 volts A.-C., single phase, three wire Edison system, including three conductors 151, 152 and 153, the conductor 152 being grounded. The conductor 151 connects with a switch 154 which when positioned as illustrated by solid lines connects the conductor 151 through a fuse 155 and a fixed resistor 156 to a variable resistor 157 having a wiper 158 in electrical contact therewith and movable therealong. The wiper 158 is connected by a conductor 159 to one terminal of the coil for the solenoid valve 141 and the other terminal of the solenoid coil is connected by a conductor 160 to the input terminal of a rectifier 161. The output terminal of the rectifier 161 provides a direct voltage which is applied by a conductor 162 to the anode 110 disposed within the chamber 106, the rectifier 161 being poled so that a positive potential with respect to ground potential is applied to the anode 110, the tank 101 being grounded by means of a conductor 152 connected to the header 103 thereof, whereby the tank serves as the cathode for the anode 110 of the electrodialysis unit 105. In order to smooth the direct voltage applied between the anode 110 and the tank 102, a capacitor 163 is provided and has one terminal thereof connected to the conductor 162 and the other terminal thereof connected by the conductor 164 to the tank 101 which is grounded as has been explained above.

It will be seen therefore that the electrodialysis unit 105 will have operating potentials applied thereto when the switch 154 is positioned to connect the fuse 155 to the conductor 151, the parts when so connected applying a direct voltage between the anode 110 and the tank 101 through the porous chamber 106, the water within the tank 101 and within the chamber 106 serving as the electrolyte therefor. The applied voltage will cause migration of anions from the tank 101 through the wall of the porous chamber 106 and into the body of anolyte 109 disposed therein. The migration of anions from the body of water within the tank 101 into the anolyte 109 will serve to raise the pH of the water within the tank 101 since the anions therein are in effect replaced by hydroxyl ions, thus raising the pH thereof. As migration of anions into the anolyte 109 proceeds, the pH of the water within the tank 101 will gradually rise, but the specific resistivity thereof may be slightly lowered due to the replacement of the anions by hydroxyl ions, whereas the increased concentration of anions in the anolyte 109 will substantially reduce the resistivity thereof whereby to cause an increase in the flow of current between the anode 106 and the inner surface of the tank 101 serving as a cathode and thus cause an increase in current flow through the solenoid valve 141. When the current flow through the solenoid valve 141 reaches a predetermined value, the valve 141 will be opened, and since the water within the tank 101 is under pressure because of the connection thereof to the supply main, water from the tank 101 will gradually pass through the openings in the porous chamber 106 at the rate of a few drops per minute thereby to force anolyte therefrom via conduits 140 and 142 to the drain. Although the passage of water through the ceramic chamber 106 is slow, eventually sufficient water will pass so that the anolyte 109 will be substantially replaced whereby to increase the resistivity thereof and thus reduce the current flow between the anode 110 and the grounded tank 101 serving as a cathode. When the current flow is reduced to a predetermined amount, the marginal solenoid valve 141 will close and will remain closed until the anion concentration in the anolyte 109 rises to a value such as to conduct a current sufficient to operate the marginal solenoid valve 141.

From the foregoing, it will be seen that the electrodialysis cell 105 may be operated substantially continuously to remove the anions from the water within the tank 101. Removal of the anions from the water will raise the pH of the water and after a sufficient period of operation the pH of the water may rise to a pH of 7 or higher whereby to provide a water which will not attack or corrode the inner wall of the tank 101 and other parts in the demineralizing system. When the pH of the water within the tank 101 rises above 7, it has been found that the walls of the tank 101 will become coated with deposits of compounds, for example, calcium carbonate or magnesium hydroxide which further serve to protect the steel tank 101 against corrosion upon subsequent addition of acid water thereto since the acid water preferentially dissolves the calcium carbonate and magnesium hydroxide or other coating and does not attack or corrode the steel tank 101. The variable resistor 157 has been provided so that the current flow through the electrodialysis unit 105 can be adjusted to accommodate different anion concentrations in the raw water in the supply pipe 120. If fewer anions are present, the wiper 158 is adjusted to provide more resistance in series with the rectifier 161 and conversely if the anion concentration is lower, then the wiper 158 is adjusted to remove resistance from the circuit and thus increase the current flow through the rectifier 161 and through the electrodialysis unit 105. Since the total current utilized is small, there is substantially no gas formation either at the anode 110 or on the surface of the steel tank 101 which serves as a cathode. Any gases such as oxygen or chlorine which are formed in the chamber 106 about the anode 110 will be flushed out when the valve 141 is opened whereby to prevent mixing thereof with any hydrogen gas which may be formed on the wall of the tank 101, the hydrogen gas formed tending to rise and be flushed from the tank 101 through the conduit 131 and the gases formed in the chamber 106 similarly rising to the top thereof and passing outwardly through a conduit 140, whereby there will be no mixing of hydrogen gas with the gases formed about the anode 110.

It further is contemplated that the tank 101 may be used as a water heater and to this end it is provided with electric heating elements 181 and 182 that have been illustrated as being of the wrap-around type. Electrical energy for operating the heating elements 181 and 182 is derived from the main conductors 151 and 153 through fuses 183 and 184 connected to the input terminals of a thermostatic switch 185, the switch 185 being provided with the usual adjusting knob 186 whereby to adjust the operating temperature of the water heater. The output terminals of the switch 185 are connected to conductors 187 and 188 which are in turn connected to the heating elements 181 and 182 which are in parallel with each other. The use of the electrodialysis unit 105 in the tank 101 has important advantages when the tank 101 is a water heater, since the heated acid waters have a greater corrosive effect upon the tank 101 than do cold acid waters.

The switch 154 can be moved to the dashed line position of FIG. 1 whereby to connect the conductor 187 to the fuse 155 whereby to provide the current for the rectifier circuit supplying the anode 110 from the conductor 187. When the circuit is thus connected, the electrodialysis unit 105 is operated only when the thermostatic switch 185 is closed whereby to provide operating potentials for the heating elements 181 and 182. Normally the thermostatic switch 185 is closed after a drawoff of water from the tank 101 through the conduit 131 followed by the admission of cold raw water through the conduit 122 into the bottom of the tank 101. Accordingly, the electrodialysis unit 105 begins to operate upon the addition of fresh cold acid water to the tank 101 since the addition of cold water thereto causes the thermostatic switch 185 to operate whereby to close the switch and to energize the heating elements 181 and 182. The electrodialysis unit 105 will continue to operate drawing anions into the anolyte 109 and thus raising the pH of the water within the tank 101 so long as the heating elements 181 and 182 are operative and more particularly as long as the thermostatic switch 185 is closed. The variable resistor 157 can be adjusted so that the electrodialysis unit 105 during the heating period withdraws sufficient anions to provide corrosion protection, the original anion concentration in the cold raw water being known.

The tank 101 further is useful as a buffer tank in the water demineralizing system when the treatment unit 201 is connected therein whereby to apply both ion exchange and electrodialysis in the treatment of the raw water whereby to provide a highly demineralized water as an output from the system. Referring to FIG. 2 of the drawings, it will be seen that the treatment unit 201 comprises an outer shell 202, a pair of permeable diaphragms 203 and 204 arranged within the outer shell 202 and cooperating therewith to define an anolyte chamber 205 having a rod-like anode 206 therein and a catholyte chamber 207 having a rod-like cathode 208a therein. The elements 202, 203 and 204 are arranged in an upstanding position, the diaphragms 203 and 204 defining therebetween a treatment chamber 210 which is provided with a transverse apertured plate 209 defining a connecting chamber 211 therebelow. Disposed upon the apertured plate 209 is a porous mass of glass fibers 212 supporting thereon a porous ion exchange bed 215 (preferably a synthetic organic polymeric exchange resin) accommodating ready passage there through of the water undergoing treatment. The resin in the bed is characterized by both anion exchange centers and cation exchange centers whereby to effect removal of both anions and cations from water passing through the treatment chamber 210. More particularly, the resin in the bed 215 may comprise a single resin having a first type of chemical groups therein defining cation exchange centers and a second type of chemical groups therein defining anions exchange centers. In another preferred construction, the bed 215 is formed of two separate and discrete resins whereby discrete particles of the two types of resins are present, one of the resins being a cation exchange resin and the other being an anion exchange resin. The two resins may be intimately mixed whereby particles of anion exchange resin are interspersed with particles of cation exchange resin or alternatively the two resins may be confined to separate beds. Preferably the resin or resins are chosen so that the bed 215 has substantially equal cation and anion exchange capacities in total grains of dissolved solids that may be removed from the water undergoing treatment.

More particularly, when a separate and discrete anion exchange resin is used with a separate and discrete cation exchange resin, the anion exchange resin is of bead-like formation and may comprise the strong base resins sold under the names "Amberlite IRA-400" and "Amberlite IRA-410"; and this cation exchange resin is of bead-like formation and may comprise the strong-acid resin sold under the name "Amberlite IR-120." An anion exchange resin of the type specified essentially comprises a stable insoluble synthetic organic polymer, active basic functional groups chemically bonded thereto and dissociable into free mobile anions to impart a positive charge to the polymer, and water in gel relationship with the polymer. Similarly, a cation exchange resin of the type specified essentially comprises a stable insoluble synthetic organic polymer, active acidic functional groups chemically bonded thereto and dissociable into free mobile cations to impart a negative charge to the polymer, and water in gel relationship with the polymer. The active basic functional groups attached to the associated organic polymer are oriented with respect to the interfaces thereof so as to be partially or completely dissociable in the internal gel water into fixed positive ions linked to the polymer and into mobile exchangeable negative ions, and similarly, the active acidic functional groups attached to the associated organic polymer are oriented with respect to the interfaces thereof so as to be partially or completely dissociable in the internal gel water into fixed negative ions linked to the polymer and into mobile exchangeable positive ions.

Typical such polymers to which active basic functional groups may be attached include: urea-formaldehyde resins, melamine-formaldehyde resins, polyalkylene-polyamine-formaldehyde resins, and the like; and such suitable active basic functional groups include: quaternary ammonium hydroxides, amino groups, the guanidyl group, the dicyanodiamidine group, and like organic nitrogen-containing basic groups; the quaternary ammonium hydroxide groups, the guanidyl and dicyanodiamidine residue being usually preferred because of their high dissociation contents. Typical such polymers to which active acidic functional groups may be attached include: phenol-aldehyde resins, polystyrene-divinylbenzene copolymers, and the like; and such suitable active acidic functional groups include: $-SO_3H$, $-COOH$, and the like; $-SO_3H$ being usually preferred because of its high dissociation constant. Normally the water in gel relationship with the polymer should be present in an amount of at least 15% of the weight of the dry resin.

Water is supplied from the tank 101 through the conduit 131 to the treatment unit 201 and particularly to the upper portion of the treatment chamber 210 thereof. An outlet conduit 220 is connected to the shell 202 and communicates with the collection chamber 211 and is connected to a first conduit 221 which conveys treated water back to the tank 101 and to the second conduit 222 which conducts treated and highly demineralized water to the point of use through the manually operable control valve 225. The conduit 221 connects to the input side of a circulating pump 170, the outlet of the pump 170 connecting with a conduit 173 which is connected through a check valve 173 to the inlet conduit 122 for the tank 101. The pump 170 is suitably driven by an electrical pump motor 171 drivingly connected thereto. Accordingly, it will be understood that the raw water to be demineralized is supplied from the pipe 120 via the conduit 122 into the lower portion of the tank 101 and thence flows through the tank 101 via the pipe 131 into the upper portion of the treatment chamber 210, and thence through the porous resin bed 215 and thence into the collecting chamber 211. The treated water further flows from the collecting chamber 211 through the conduits 220 and 221 to the pump 170, and thence via the conduit 172 and the check valve 173 to the inlet conduit 122 for the tank 101. If there is a demand for treated water, water also may flow from the collecting chamber 211 via the conduits 220 and 222 and the valve 225 to a point of use or from the buffer tank 101 via the conduits 131 and 133 and the valve 132 to another point of use. In the circulation of the water exchange described above, it is demineralized; whereby the demineralized water is accumulated in the tank 101 and the treatment unit 201 for dispensing through the outlet conduits 133 and 222 as required.

The anolyte chamber 205 and the catholyte chamber 207 are provided with apparatus to supply fresh anolyte and catholyte thereto; more particularly, raw water from the inlet pipe 120 is conveyed via the pipe 123 to the input side of a solenoid valve 226. The outlet side of the solenoid valve 226 is connected to a conduit 227 which is provided with a first outlet 228 for anolyte and a second outlet 229 for catholyte. The lower portion of the anolyte chamber 205 communicates with an upstanding conduit 231 extending upwardly through the anolyte chamber 205 and to the exterior of the outer shell 202 and is provided on the upper end thereof with a funnel 232 for receiving fresh anolyte from the outlet 228 for delivery to the anolyte chamber 205. Similarly, the lower portion of the catholyte chamber 207 connects with an upstanding conduit 233 which extends through the upper portion of the outer shell 202 and is provided at the upper end thereof with a funnel 234 cooperating with the outlet 229 for delivery of catholyte into the catholyte chamber 207. Accordingly, raw water can be fed from the supply pipe 120 via the conduits 123 and 227 under the control of the solenoid valve 226 and via the outlets 228 and 229 into the funnels 232 and 234 to supply new anolyte and catholyte to the anolyte chamber 205 and the catholyte chamber 207, respectively. Upon the addition of new anolyte to the anolyte chamber 205, the excess anolyte flows through a conduit 235 communicating with the upper portion of the anolyte chamber 205, the conduit 235 communicating with the drain. A similar overflow conduit 236 is provided for the catholyte chamber 207 and communicates with the upper portion thereof, the conduit 236 also communicating with the drain. The conduits 235 and 236 serve to regulate the maximum amount of anolyte and catholyte present in the anolyte chamber 205 and the catholyte chamber 207, respectively.

The treatment unit 201 is supplied with operating potentials from a rectifier 240 which has the input terminals thereof connected to the main supply conductors 151 and 153. The negative output terminal of the rectifier 240 is connected to ground through the conductor 152 and is further connected to the upper end of the cathode 208a by two parallel circuits. The first circuit includes a normally closed switch 255a interconnecting the conductor 152 and a variable resistor 256a having a movable contact 257a thereon selectively shorting out a portion of the resistance but normally being positioned to short out all of the resistance of the resistor 256a as illustrated in FIG. 2. A conductor 252a connects the resistor 256a to the upper end of the cathode 208a. The second parallel circuit is from the conductor 152 through a pair of normally closed switch contacts 251a to a conductor 258a which connects to one end of a variable resistor 253a. The variable resistor 253a is provided with a movable contact 254a making electrical connection therewith and connected to short out selected portions of the resistance of the resistor 253a and, more particularly, is connected to the conductor 252a whereby to form a connection with the cathode 208a. Normally the resistor 253 is completely shorted out as illustrated in FIG. 2.

The demineralizing system 100 further comprises a timer motor 242 of the synchronous type and bridged across the conductors 151 and 153. Preferably the timer motor 242 is of the "Telechron" type and comprises an output shaft 243 having a first switch actuating cam 244 driven thereby for controlling the opening and closing of a switch 245. The switch 245 is biased open and when closed by the cam 244 connects the conductor 151 to a conductor 246 whereby to apply electrical energy to the pump motor 171 which has the other input terminal thereof grounded through the conductor 152. A second switch actuating cam 247 is driven by the timer motor shaft 243 and controls a normally biased open switch 245. When the cam 247 is in position to close the switch 248, the switch connects the conductor 151 to a conductor 249 connected to one of the input terminals of the solenoid valve 226 being grounded through the conductor 152.

In view of the foregoing, it will be understood that in the operation of the demineralizing system, the timer motor 212 periodically closes and later opens the switch 245, whereby the electric drive motor 171 is periodically operated to effect operation of the pump 170, with the result that the water undergoing treatment is circulated from the treatment chamber 210 of the treatment unit 201 and through the tank 101 and then back to the treatment chamber 210; whereby the circulated water is demineralized as previously noted. Also, in the operation of the demineralizing system, the timer motor 242 periodically closes and later opens the switch 248, whereby the solenoid of the valve 226 is correspondingly energized and later deenergized periodically. When the solenoid of the valve 226 is thus energized, the valve 226 is operated from its closed position into its open position so as to supply water through the conduit 227 to be used as fresh anolyte from the outlet 228 via the funnel 232 and the conduit 231, and further to supply water as fresh catholyte from the conduit 227 via the outlet 229 into the funnel 234 and the conduit 233 and thus into the catholyte chamber 207. When the fresh anolyte is thus supplied into the anolyte chamber 205, the anolyte therein is displaced therefrom and flows via the conduit 235 to the drain (not shown); and likewise when fresh catholyte is thus supplied into the catholyte chamber 207 the catholyte therein is displaced therefrom and flows via the conduit 236 to the drain.

During the operation of the treatment unit 201 in accordance with the present invention it is desirable to apply an operating potential thereto in a manner such as to cause a substantially constant rate of migration of anions from the resin 215 into the anolyte chamber 205 and to cause alternately lesser and greater rates of migration of cations from the resins 215 into the catholyte chamber 207 or even to cause back diffusion of cations from the catholyte chamber 207 into the treatment chamber 210 or alternatively to cause a rate of migration of cations equal to that of the anions. To this end a second cathode 208b is provided for the treatment unit 201 and is positioned in the treatment chamber 213 and disposed toward the diaphragm 204 which forms a common wall between the treatment chamber 210 and the catholyte chamber 207. The timer motor 242 further drives a third switch actuating cam 250 controlling a switch 251 having a pair of normally biased closed contacts 251a and a pair of normally biased open contacts 251b. When the cam 250 is in the position illustrated in FIG. 2, the contacts 251a are closed whereby to connect the ground potential on the conductor 152 to the cathode 208a via the conductor 258a, the resistor 253a and the by-pass contact 254a. When the cam 250 is in the position to close the switch contacts 251b, the switch contacts 251a are open and a connection is made from the conductor 152 through the switch contacts 251b via a conductor 258a, a resistor 253a having a movable contact 254a, and the conductor 252a to the upper end of the cathode 208b, whereby ground potential is applied to both the cathode 208a and the cathode 208b when the switch 255a is in its normally closed position so that there is no driving potential between the cathodes 208a and 208b, the anode 206 in effect operating only in cooperation with the cathode 208b. As a result there will be no migration of cations from the resin bed 215 into the catholyte chamber 207 but there will be movement of anions from the resin bed 215 into the anolyte chamber 206 in the usual manner. As has been explained above, the cation exchange centers or resins are more readily regenerated than the anion exchange centers or resins whereby the cation exchange resin may be said to have a higher rate of regeneration, assuming that the anion and cation resins are at a similar state of generation. The above described method of operation of the system therefore continuously regenerates the anion exchange resin at a predetermined rate, and periodically applies potentials to cause regeneration of the cation exchange resin at a rate higher than that of the anion exchange resin and at other times at a rate lower than that of the anion exchange resin, the latter rate being substantially zero, whereby to achieve substantially equal regeneration of the cation exchange resin and the anion exchange resin by proper arrangement of the switch actuating cam 250.

In another preferred method of operation of the treatment unit 201, the cathode 208b is connected to the rectifier 240 continuously. To this end the conductor 152 is connected through a normally open switch 255b to one end of a resistor 256b having a movable contact 257b thereon normally to short out a portion of the resistance thereof, the other end of the resistor 256b being connected to the conductor 252b. Accordingly, when the switch 255b is closed, some potential slightly positive with respect to ground is applied to the cathode 208b continuously. The operation of the cam 250 may apply ground potential to the cathode 208b by the contacts 251b or some other potential can be applied or even the same potential by properly adjusting the shorting contact 254b along the resistor 253b.

In view of the foregoing, it will be understood that in the operation of the system 100, the tank 101 may be used as a water storage tank, the switch 154 being positioned to connect the conductor 151 to the fuse 155 whereby to operate the electrodialysis unit 105 directly from the supply line 151. When the system is so operated, raw water which may have a substantial acid content indicating an excess of anions therein as compared to the cations therein will be obtained from the supply pipe 120 under pressure to the conduit 122 and via the diffuser 130 into the bottom of the tank 101. The electrodialysis unit 105 will operate to draw anions from the body of water in the tank 101 through the porous ceramic chamber 106 into the anolyte 109 thereof, the anolyte 109 becoming increasingly more acid during operation while the water within the tank 101 becomes less acid, the pH rising to a value above pH 7. Further protection for the walls of the tank 101 is provided by the fact that if calcium, magnesium and carbonate ions are present in the raw water, a further protective coating of calcium carbonate and magnesium hydroxide will be formed on the inner wall of the tank 101 whereby partially to neutralize fresh acid raw water as it is introduced into the bottom of the tank 101. Eventually the ion concentration in the anolyte 109 will rise to a value such that the current flow between the anode 110 and the wall of the tank 101 acting as a cathode will be sufficient such that the flow of current through the solenoid of the valve 141 will be enough to open the normally closed valve 141 and thus permit seepage of water into the anolyte 109, the excess anolyte overflowing through the conduit 140 via the conduit 142 to the drain. In a practical system, the flow rate through the anolyte 109 is only a few drops per minute which is sufficient to reduce the ion concentration in the anolyte 109 but is not sufficient seriously to decrease the water in the tank 101. When the ion concentration in the anolyte 109 has fallen to a predetermined value, the current flowing through the solenoid of the valve 141 will be too low to hold the valve open and therefore the valve will close whereby to interrupt the flow of fresh anolyte through the porous chamber wall 106. Any gases formed at the anode or at the cathode will be flushed from the tank 101 without coming into contact, the anode gases being flushed to the drain by the conduits 140 and 142 and the cathode gases passing through the conduit 131 to the first outlet pipe 133 via the valve 132.

The tank 101 can also be operated as a hot water storage tank by applying heating potential from the conductors 151 and 153 through the thermostatic switch 185 to the heating elements 181 and 182. The electrodialysis unit 105 may be utilized as described above, the operating current therefor being obtained directly from the conductor 151 by placing the switch 154 in position to connect the conductor 151 and the fuse 155. Alternatively the switch 154 may be positioned to connect the conductor 187 to the fuse 155 whereby the electrodialysis unit 105 is operated only when the heating elements 181 and 182 are operated. In this arrangement, a draw-off of heated alkaline water from the tank 101 through the conduit 131 via the valve 132 and the outlet 133 will cause the introduction of cold raw acid water from the supply pipe 120 to the bottom of the tank 101. The thermostatic switch 185 will sense the condition of the cold water in the bottom thereof to close the switch and apply operating potential to the conductors 187 and 183. Accordingly, the heating elements 181 and 182 will begin to operate to heat the water within the tank 101. The introduction of the raw water into the tank 101 will also raise the anion content of the water in the tank; these excess anions will then be removed by the electrodialysis unit 105 which will be operated since the thermostatic switch 185 has been closed. The resistor 157 can be adjusted with knowledge of the anion content of the raw water and the temperature thereof so that the required amount of anions will be removed by the electrodialysis unit 105 during the time that the thermostatic switch 185 is closed i.e. during the time that it is required to operate the heating elements 181 and 182 whereby to raise the temperature of the water in the tank 101 to the desired operating temperature therefor.

The demineralizing system can further be operated to combine ion exchange with electrodialysis whereby to provide substantially completely demineralized water, the water being either heated or unheated as the case may be depending upon whether the tank 101 is operated as a storage tank or as both a storage tank and a water heater. The tank 101 when used in combination with the treatment unit 201 to provide highly demineralized water serves as a buffer tank in the system. In the operation of the demineralizing system, the timer motor 242 periodically closes and later opens the switch 245, whereby the electric drive motor 171 is correspondingly periodically operated to effect corresponding operation of the pump 170 with the result that the water undergoing treatment is circulated from the treatment chamber 210 of the treatment unit 201 and through the buffer tank 101 and thus back to the treatment unit 210 whereby the circulated water is demineralized as previously noted. Also in the operation of the demineralizing system, the timer motor 242 periodically closes and later opens the switch 248, whereby the solenoid of the valve 226 is correspondingly energized and later deenergized periodically. When the solenoid of the valve 226 is thus energized, the valve 226 is operated from its closed position into its open position so as to supply water as fresh anolyte from the conduit 227 via the conduit 228 into the funnel 232 and thus into the anolyte chamber 205; fresh catholyte is likewise provided on the opening of the solenoid valve 226 from the conduit 227 via the conduit 229 into the funnel 234 and thus into the catholyte chamber 207 of the treatment unit 201. When fresh anolyte is supplied to the anolyte chamber 205, the anolyte therein is displaced therefrom and flows via the conduit 235 to the drain; and likewise when fresh catholyte is supplied to the catholyte chamber 207, the catholyte therein is displaced therefrom and flows via the conduit 236 to the drain.

When the valve 225 is opened, the demineralized water flows from the conduit 222, while raw water from the supply pipe 120 is supplied via the conduit 122 into the bottom of the buffer tank 101 and forces the previously demineralized water therefrom through the treatment unit 201 and into the demineralized water supply pipe 222. In the arrangement, when demineralized water is drawn off from the conduit 222, raw water is supplied to the bottom of the buffer tank 101 and mixes with the previously demineralized water therein so that a substantial dilution of the raw water takes place, and thereafter the mixed water is pumped in the local loop circuit from the treatment unit 201 into the buffer tank 101 back to the treatment unit 201 and through the ion exchange bed 215 so as to effect demineralization of the mixed water and the corresponding degeneration of the ion exchange bed 215. After the draw-off from the system, and as time proceeds, the ion exchange bed 215 is regenerated by virtue of the application of the potential between the anode 206 and the cathodes 208a and 208b. Specifically, the bed 215 is regenerated with the exchange of the sorbed anions and cations of the mineral salts for hydroxyl ions and hydrogen ions and with the migration of the anions of the mineral salts through the diaphragm 203 into the anolyte contained in the anolyte chamber 205 and with the migration of the cations of the mineral salts through the diaphragm 204 into the catholyte contained in the catholyte chamber 207. The anions and the cations are subsequently flushed along with the anolyte and catholyte from the respective chambers 205 and 207 and are ultimately carried into the drain. The electrodialysis unit 105 further serves to remove anions from the water, the anions being flushed to the drain via the conduits 140 and 142 as has been described above.

In the system the conduits 131, 220, 221 and 222, or at least appropriate sections thereof, are formed of insulating material in order to minimize stray electric currents therebetween by virtue of the fact that the potential with respect to ground potential in the upper portion of the treatment unit 201 may be substantially different from that in the bottom of the treatment unit 201.

In a constructional example of the system 100, the treatment unit 201 is provided with a mixed resin bed 215 containing separate and discrete anion exchange resin particles and separate and discrete cation exchange resin particles, the two resins having equal volumes and containing equal volumes of resin, and may, for example, contain one cubic foot of the appropriate resin. Moreover, in the demineralizing system, the water pressure in the treatment unit 201 should not be in excess of 45 p.s.i. When the resin beds are fully regenerated and a draw-off of demineralized water from the supply pipe 222 is effected, the resins are degenerated by substantially equal amounts, whereby it is desirable that the rates of recovery or regeneration of the resins should be equal in the time interval immediately following the draw-off of demineralized water from the conduit 222; and this can be accomplished by matching the regeneration or recovery rates of the resins. Specifically, in order to obtain this objective in accordance with one preferred method of operating the system 100, the anion exchange resin is preferably maintained under a substantially constant operating potential whereby to effect substantially constant regeneration thereof. At the same time the regeneration rate of the cation exchange resin is varied and is selectively alternately changed between a first constant regeneration rate substantially higher than the regeneration rate of the anion exchange resin and a second lower regeneration rate which is substantially less than the regeneration rate of the anion exchange resin, the second rate being essentially zero, whereby over a suitable period of time the total regeneration of the cation exchange resin substantially matches that of the total regeneration of the anion exchange resin. The above described method is achieved by operating the system 100 with the switch 255a closed, the switch 255b open and the resistors 253a, 253b and 256a completely shorted out, all as is illustrated in FIG. 2 of the drawings. With the parts so connected and adjusted, the first regeneration rate of the cation exchange resin is obtained by applying the full operating voltage between the cathode 208a disposed in the catholyte chamber 207 and the anode 206. The lower regeneration rate of the cation exchange resin is obtained by closing the switch contacts 251b whereby to place the cathode 208b disposed in the treatment chamber 210 in the circuit in parallel with the cathode 208a. There will be no driving potential between the resin 215 in the treatment chamber 210 and the catholyte in the catholyte chamber 207 so that substantially no regeneration of the cation exchange resin is obtained and there will be substantially no passage of cations through the diaphragm 204 from the treatment chamber 210 into the catholyte chamber 207 or from the catholyte chamber 207 into the treatment chamber 210. The total time of concurrent application of operating potential to the cathodes 208a and 208b will be chosen with respect to the nonconcurrent operation thereof so that the total cation extraction from the resin 215 will equal the total anion extraction therefrom during a complete cycle of operation of the treatment unit.

In a second preferred method of operating the treatment unit 201 to achieve substantially equal regeneration of the anion exchange centers and the cation exchange centers in the resin 215, both the switches 255a and 255b are placed in their respective open positions so that potential will be applied alternately or nonconcurrently to the cathodes 208a and 208b by operation of the control cam 250. When the switch contacts 251a are closed, ground potential will be applied from the conductor 152 to the cathode 208a, whereby to obtain a first high regeneration rate of the cation exchange resin. Thereafter the cam 250 will operate to open the switch contacts 251a and to close the switch contacts 251b thereby removing ground potential from the cathode 208a and applying ground potential from the conductor 152 to the cathode 208b. This will provide a second regeneration rate of the cation exchange centers which will be less than the regeneration rate of the anion exchange centers. By proper shaping of the cam 250, the time of application of operating potential to the cathodes 208a and 208b can be adjusted so that the total cation regeneration will equal the total anion regeneration over a period of time. When no potential is applied to the cathode 208a and ground potential is applied to the cathode 208b, there will be back migration or diffusion of cation from the catholyte chamber 207 into the treatment chamber 210 whereby further to reduce the cation regeneration rate as compared to the case wherein ground potential is applied concurrently to both the cathodes 208a and 208b.

In a third preferred method of operating the treatment unit 201, both the switches 255a and 255b are placed in the closed positions thereof and the resistors 253a and 253b are adjusted so that the maximum resistance is presented thereby, the resistance values of the resistors 253a and 253b being sufficiently high that they present a substantially open circuit condition even when connected through the switch contacts 251a or 251b to the conductor 152. Operating potential will now be concurrently applied to both the cathode 208a and the cathode 208b and the values of the potentials applied thereto can be adjusted by means of the resistors 256a and 256b so that the rate of cation extraction from the bed 215 will be equal to the rate of anion extraction from the bed 215. Thus by suitably adjusting the values of the resistors 256a and 256b in the circuit, the total anion extraction can be matched with the total cation extraction for continuous operation of the treatment unit 201.

It is further pointed out that in any of the three methods of operating the treatment unit 201 described above, the various adjustable resistors 253a, 253b, 256a and 256b can be adjusted to obtain the optimum operating characteristics for the treatment unit 201.

In the overall operation of the system to demineralize water, the electrodialysis cell 105 will remove a certain portion of the anions from the raw water and the remaining anions extracted from the water will be removed by the anion exchange resin in the treatment unit 201. All of the cations removed during the demineralization of the water will be removed by the cation exchange resin in the treatment chamber 210. The regeneration of the cation exchange resin can be adjusted by suitable operation of the cam 250 in cooperation with the switch contacts 251b whereby the removal of the anions by the anion exchange resin and the removal of cations by the cation exchange resin will be balanced to obtain an output from the treatment unit 201 in the supply conduit 222 which has substantially the pH of the water entering the treatment unit 201 through the conduit 131, whereby the demineralized water from the outlet conduit 222 will be neutral or slightly alkaline and substantially the same pH as the water entering the treatment unit 201 from the conduit 131.

Further, in a practical installation, the first outlet conduit 133 would be connected to points requiring large volumes of water at which fully demineralized water is not necessarily required such as in a shower or a bathtub, whereas the second demineralized water outlet conduit 222 would be connected to those points of use which require highly demineralized water and generally in lower volumes such as dish washers, clothes washers, and the like. Accordingly a large sustained draw-off such as during a shower will cause demineralized water in the buffer tank 101 to be drawn into the conduit 131 and to the point of use via the valve 132 and the conduit 133. At the beginning of the draw-off the water will be substantially fully demineralized but in the course of a long sustained draw-off, the water will become progressively less highly demineralized and eventually substantially raw water will issue from the output conduit 133. The passage of such water having a high mineral content directly through the treatment unit 201 would rapidly exhaust the unit 201 and further would place the resins therein in such a condition that it would require a substantial period of time to effect any substantial regeneration thereof by the application of the regenerating potential between the anode 206 and the cathode 208. By selectively connecting the points of use requiring large sustained draw-offs and not requiring highly demineralized water to the first outlet conduit 133, the demineralization capacities of the treatment unit 201 is reserved for those points of use which do require highly demineralized water, those points of use being connected to the second outlet conduit 222.

It is to be understood in the above description of the system when utilizing both ion exchange and electrodialysis to demineralize the water, the buffer tank 101 may also be utilized as a water heater, whereby to supply hot demineralized water to the outlet conduits 133 and 222. Further, the switch 154 may be placed in either of the positions thereof whereby either to operate the electrodialysis unit 105 continuously or to operate the electroalysis unit 105 only when the heating elements 181 and 182 are operated.

Recapitulating: in the system of the present invention, the storage tank for the water is protected from attack by acid raw waters by employing therein an electrodialysis unit which preferentially removes anions from the water to raise the pH thereof and also when the pH rises above 7 to deposit a protective coating of basic salts on the walls of the tank, the salts reacting with subsequently added raw water to raise the pH thereof. When producing fully demineralized water using the system of the present invention, the water to be demineralized is first introduced into the buffer tank containing previously demineralized water so that it is substantially diluted; and the resulting mixed water is circulated in local loop circuits from the buffer tank to an ion exchange bed and back to the buffer tank. The cation exchange resin and the anion exchange resin in the bed are regenerated by like amounts at equal average rates; more specifically, the anion exchange resin is regenerated at a predetermined rate and the cation exchange resin is regenerated at the same rate or is alternately regenerated at a first rate relatively higher than the predetermined rate of the anion exchange resin and at a second rate substantially lower than the predetermined rate of the anion exchange resin, the second regeneration rate being in one preferred method of operation substantially zero, so that the total regeneration of the anion exchange resin substantially matches the total regeneration of the cation exchange resin. The control of the regeneration rate of the cation exchange resin is accomplished by increasing the effective resistance through the bed which is in turn achieved by placing a second cathode in the bed adjacent to the catholyte chamber whereby to modify the force moving cations from the resin bed into the catholyte chamber. The supply of adequate amounts of highly demineralized water to those points requiring such water is assured in the present system by providing a second outlet for demineralized water positioned between the buffer tank and the treatment unit and connecting to points of use requiring less highly demineralized water and being subject to long sustained draw-offs.

In view of the foregoing, it is apparent that there has been provided an improved water demineralizing method and system utilizing electrodialysis to provide corrosion protection for the storage tank and other parts subject to corrosion coming in contact with the water and further a system involving both ion exchange and electrodialysis, wherein the recovery or regeneration rates of the anion exchange resin and the cation exchange resin are substantially matched, so that the states of charge or regeneration of the two resins are substantially matched in the operation of the system.

While there has been described what is at present considered to be a certain preferred embodiment of the invention, it will be understood that various modifications may be made therein, and it is intended to cover in the appended claims all such modifications as fall within the true spirit and scope of the invention.

What is claimed is:

1. Apparatus for demineralizing raw water containing dissolved metal salts; said apparatus comprising a buffer tank, an inlet pipe adapted to contain raw water under pressure and connected to the bottom of said buffer tank, an electrolytic cell including structure defining a treatment compartment and a catholyte compartment and an anolyte compartment with a first ion permeable diaphragm as a common wall between said treatment compartment and said catholyte compartment and with a second ion permeable diaphragm as a common wall between said treatment compartment and said anolyte compartment, said electrolytic cell also including a cathode in said catholyte compartment and an anode in said anolyte compartment, means for supplying raw water as a catholyte from said inlet pipe into said catholyte compartment and for supplying raw water as an anolyte from said inlet pipe into said anolyte compartment, a bed of ion exchange material arranged in said treatment compartment and including both cation exchange centers and anion exchange centers, a first conduit connecting the top of said buffer tank and the top of said treatment compartment, a second conduit connecting the bottom of said treatment compartment and the bottom of said buffer tank, a pump included in said second conduit and operative to effect local circulation of water from the bottom of said treatment chamber via said second conduit into the bottom of said buffer tank and from the top of said buffer tank via said first conduit into the top of said treatment chamber, whereby the circulated water proceeds upwardly through said buffer tank and downwardly through said treatment chamber and whereby the circulated water is demineralized by said bed with the resulting degeneration thereof, means for applying a potential between said anode and said cathode to cause displacement of sorbed cations from said bed through said first diaphragm into the catholyte in said catholyte compartment and to cause displacement of sorbed anions from said bed through said second diaphragm into the anolyte in said anolyte compartment with the resulting regeneration of said bed, a first drawoff conduit connected to the bottom of said treatment compartment, a first drawoff valve included in said first drawoff conduit, whereby opening of said first drawoff valve effects the flow of raw water from said inlet pipe into the bottom of said buffer tank and the consequent flow of water through said buffer tank via said first conduit into the top of said treatment compartment and therethrough and through said bed into said first drawoff conduit and therefrom to the exterior with the result that both the storage capacity of said buffer tank and the demineralizing capacity of said bed may be employed in supplying a demand for demineralized water from said first drawoff conduit, a second drawoff conduit connected to the top of said buffer tank, and a second drawoff valve included in said second drawoff conduit, whereby opening of said second drawoff valve effects the flow of raw water from said inlet pipe into the bottom of said buffer tank and the consequent flow of water through said buffer tank into said second drawoff conduit and therefrom to the exterior with the result that only the storage capacity of said buffer tank may be employed in supplying a demand for demineralized water from said second drawoff conduit.

2. The apparatus set forth in claim 1, and further comprising means for heating the water stored in said buffer tank, whereby hot demineralized water is supplied from either one of said drawoff conduits upon opening of the corresponding one of said drawoff valves.

3. Apparatus for demineralizing raw water containing dissolved metal salts; said apparatus comprising a buffer tank, an inlet pipe adapted to contain raw water under pressure and connected to said buffer tank, hollow structure defining an anolyte chamber and including a porous wall that is permeable both to water and to ions contained therein, means for mounting said structure upon said buffer tank in sealed relation therewith and with said porous wall in covering relation with an opening provided in said buffer tank, whereby one side of said porous wall is in contact with the water in said buffer tank and the other side of said porous wall is in contact with the anolyte in said anolyte chamber, an anode element disposed in said anolyte chamber in contact with the anolyte therein and electrically insulated from said buffer tank, means for applying a potential between said anode element and said buffer tank as a cathode element so as to cause migration of anions from the water in said buffer tank through said porous wall into the anolyte in said anolyte chamber, whereby the pH of the water in said buffer tank is increased, means for selectively discharging to the exterior anolyte from said anolyte chamber, whereby water from said buffer tank passes through said porous wall as fresh anolyte into said anolyte chamber, an electrolytic cell including structure defining a treatment compartment and a catholyte compartment and an anolyte compartment with a first ion permeable diaphragm as a common wall between said treatment compartment and said catholyte compartment and with a second ion permeable diaphragm as a common wall between said treatment compartment and said anolyte compartment, said electrolytic cell also including a cathode member in said catholyte compartment and an anode member in said anolyte compartment, a bed of ion exchange material arranged in said treatment compartment and including both cation exchange centers and anion exchange centers, conduit means completing a closed series loop circuit from said buffer tank to said treatment compartment and thence back to said buffer tank, an outlet pipe adapted to contain demineralized water under pressure and connected to said loop circuit on the outlet side thereof, valve mechanism arranged in said outlet pipe, whereby opening of said valve mechanism effects the supply of demineralized water from said treatment compartment to said outlet pipe and effects the supply of raw water from said inlet pipe to said buffer tank, pump means for effecting local circulation of water in said loop circuit from said buffer tank through said treatment compartment and back to said buffer tank, whereby the circulating water is demineralized by said bed with the resulting degeneration thereof and whereby the pH of the water in said treatment compartment is decreased, and means for applying a potential between said anode member and said cathode member to cause displacement of sorbed cations from said bed into the catholyte in said catholyte compartment and displacement of sorbed anions from said bed into the anolyte in said anolyte compartment with the resulting regeneration of said bed.

4. Apparatus for demineralizing raw water containing dissolved metal salts, comprising an electrolytic cell including structure defining first and second and third chambers, a first ion permeable diaphragm disposed as a common wall between said first and second chambers and a second ion permeable diaphragm disposed as a common wall between said second and third chambers, a bed of ion exchange material having both cation exchange centers and anion exchange centers and disposed in said second chamber, means for conducting raw water through said second chamber into contact with said diaphragms and into ion exchange relation with said bed, whereby the raw water is demineralized with the resulting degeneration of said bed, said first chamber being adapted to contain a body of anolyte therein in contact with said first diaphragm and said third chamber being adapted to contain a body of catholyte therein in contact with said second diaphragm, an anode disposed in said first chamber and a first cathode disposed in said third chamber and a second cathode disposed in said second chamber, and means for selectively applying potential between said anode and said first and second cathodes, whereby the application of potential between said anode and said first cathode nonconcurrently with the application of potential between said anode and said second cathode effects substantial displacements both of sorbed anions from said bed into the anolyte in said first chamber and of sorbed cations from said bed into the catholyte in said third chamber, and whereby the application of potential between said anode and said second cathode either concurrently or nonconcurrently with the application of potential between said anode and said first cathode effects substantial displacement only of sorbed anions from said bed into the anolyte in said first chamber, said displacements of sorbed anions and sorbed cations from said bed effecting corresponding anion regeneration and cation regeneration of said bed.

5. The apparatus set forth in claim 4, wherein said second cathode is disposed in said second chamber adjacent to said second diaphragm, so that the major portion of said bed is disposed between said first diaphragm and said second cathode.

6. The apparatus set forth in claim 4, wherein said bed of ion exchange material comprises a mixed bed of discrete particles of anion exchange resin and of cation exchange resin.

7. Apparatus for demineralizing raw water containing dissolved metal salts, comprising an electrolytic cell including structure defining first and second and third chambers, a first ion permeable diaphragm disposed as a common wall between said first and second chambers and a second ion permeable diaphragm disposed as a common wall between said second and third chambers, a bed of ion exchange material having both cation exchange centers and anion exchange centers and disposed in said second chamber, means for conducting raw water through said second chamber into contact with said diaphragms and into ion exchange relation with said bed, whereby the raw water is demineralized with the resulting degeneration of said bed, said first chamber being adapted to contain a body of anolyte therein in contact with said first diaphragm and said third chamber being adapted to contain a body of catholyte therein in contact with said second diaphragm, an anode disposed in said first chamber and a first cathode disposed in said third chamber and a second cathode disposed in said second chamber, and cyclic means for applying potential between said anode and said first and second cathodes, wherein in each cycle potential is applied during a first time interval between said anode and said first cathode nonconcurrently with the application of potential between said anode and said second cathode and potential is applied during a second time interval between said anode and said second cathode either concurrently or nonconcurrently with the application of potential between said anode and said first cathode, whereby during said first time interval there are effected substantial displacements of both sorbed anions from said bed into the anolyte in said first chamber and of sorbed cations from said bed into the catholyte of said third chamber, and whereby during said second time interval there is effected substantial displacement only of sorbed anions from said bed into the anolyte in said first chamber, said displacements of sorbed anions and sorbed cations from said bed effecting corresponding anion regeneration and cation regeneration of said bed.

8. The apparatus set forth in claim 7, wherein during said first time interval the rate of displacement of sorbed cations from said bed is substantially higher than the rate of displacement of sorbed anions from said bed, and wherein said first and second time intervals are so related that during each cycle the total displacements of sorbed anions and of sorbed cations from said bed are substantially equivalent in order to effect substantially equivalent anion regeneration and cation regeneration of said bed.

9. Apparatus for demineralizing raw water containing dissolved metal salts, comprising an electrolytic cell including structure defining first and second and third chambers, a first ion permeable diaphragm disposed as a common wall between said first and second chambers and a second ion permeable diaphragm disposed as a common wall between said second and third chambers, a bed of ion exchange material having both cation exchange centers and anion exchange centers and disposed in said second chamber, means for conducting raw water through said second chamber into contact with said diaphragms and into ion exchange relation with said bed, whereby the raw water is demineralized with the resulting degeneration of said bed, said first chamber being adapted to contain a body of anolyte therein in contact with said first diaphragm and said third chamber being adapted to contain a body of catholyte therein in contact with said second diaphragm, an anode disposed in said first chamber and a first cathode disposed in said third chamber and a second cathode disposed in said second chamber, and means for continuously applying potential between said anode and said first cathode and for selectively applying potential between said anode and said second cathode, whereby the application of potential between said anode and said first cathode nonconcurrently with the application of potential between said anode and said second cathode effects substantial displacements both of sorbed anions from said bed into the anolyte in said first chamber and of sorbed cations from said bed into the catholyte in said third chamber, and whereby the application of potential between said anode and said second cathode concurrently with the application of potential between said anode and said first cathode effects substantial displacement only of sorbed anions from said bed into the anolyte in said first chamber, said displacements of sorbed anions and sorbed cations from said bed effecting corresponding anion regeneration and cation regeneration of said bed.

10. Apparatus for demineralizing raw water containing dissolved metal salts, comprising an electrolytic cell including structure defining first and second and third chambers, a first ion permeable diaphragm disposed as a common wall between said first and second chambers and a second ion permeable diaphragm disposed as a common wall between said second and third chambers, a bed of ion exchange material having both cation exchange centers and anion exchange centers and disposed in said second chamber, means for conducting raw water through said second chamber into contact with said diaphragms and into ion exchange relation with said bed, whereby the raw water is demineralized with the resulting degeneration of said bed, said first chamber being adapted to contain a body of anolyte therein in contact with said first diaphragm and said third chamber being adapted to contain a body of catholyte therein in contact with said second diaphragm, an anode disposed in said first chamber and a first cathode disposed in said third chamber and a second cathode disposed in said second chamber, and means for alternately applying potential between said anode and said first cathode and between said anode and said second cathode, whereby the application of potential between said anode and said first cathode effects substantial displacements both of sorbed anions from said bed into the anolyte in said first chamber and of sorbed cations from said bed into the catholyte in said third chamber, and whereby the application of potential between said anode and said second cathode effects substantial displacement only of sorbed anions from said bed into the anolyte in said first chamber, said displacements of sorbed anions and sorbed cations from said bed effecting corresponding anion regeneration and cation regeneration of said bed.

11. Apparatus for demineralizing raw water containing dissolved metal salts, comprising an electrolytic cell including structure defining first and second and third chambers, a first ion permeable diaphragm disposed as a common wall between said first and second chambers and a second ion permeable diaphragm disposed as a common wall between said second and third chambers, a bed of ion exchange material having both cation exchange centers and anion exchange centers and disposed in said second chamber, means for conducting raw water through said second chamber into contact with said diaphragms and into ion exchange relation with said bed, whereby the raw water is demineralized with the resulting degeneration of said bed, said first chamber being adapted to contain a body of anolyte therein in contact with said first diaphragm and said third chamber being adapted to contain a body of catholyte therein in contact with said second diaphragm, an anode disposed in said first chamber and a first cathode disposed in said third chamber and a second cathode disposed in said second chamber, and means for applying a relatively high potential between said anode and said first cathode and for applying a relatively low potential between said anode and said second cathode, whereby the applications of said potentials effect both a substantial displacement of sorbed anions from said bed into the anolyte in said first chamber and a substantial displacement of sorbed cations from said bed into the catholyte in said third chamber, said displacement of sorbed anions from said bed effecting corresponding anion regeneration thereof at a first rate and said displacement of sorbed cations from said bed effecting corresponding cation regeneration thereof at a second rate, and wherein said first and second regeneration rates substantially match each other so as to maintain substantially equivalent anion regeneration and cation regeneration of said bed.

12. The method of demineralizing raw water containing dissolved metal salts, comprising passing the raw water through a bed of ion exchange material including both anion exchange centers and cation exchange centers and contained in an inner compartment of an electrolytic cell and separated by a first ion permeable diaphragm from a body of anolyte and separated by a second ion permeable diaphragm from a body of catholyte, and selectively applying potential between an anode arranged in contact with said body of anolyte and first and second cathodes respectively arranged in contact with said body of catholyte and in contact with the water in said inner compartment, whereby the application of potential between said anode and said first cathode nonconcurrently with the application of potential between said anode and said second cathode effects substantial displacements both of sorbed anions from said bed into said body of anolyte and of sorbed cations from said bed into said body of catholyte, and whereby the application of potential between said anode and said second cathode either concurrently or nonconcurrently with the application of potential between said anode and said first cathode effects substantial displacement only of sorbed anions from said bed into said body of anolyte, said displacements of sorbed anions and sorbed cations from said bed effecting corresponding anion regeneration and cation regeneration of said bed.

13. The method set forth in claim 12, wherein said second cathode is disposed in said inner compartment adjacent to said second diaphragm so that the major portion of said bed is disposed between said first diaphragm and said second cathode, whereby the major portion of said bed is subjected to anion regeneration upon application of potential between said anode and said second cathode.

14. The method set forth in claim 12, wherein said bed comprises a mixed bed of discrete particles of anion exchange resin and of cation exchange resin.

15. The method of demineralizing raw water containing dissolved metal salts, comprising passing the raw water through a bed of ion exchange material including both anion exchange centers and cation exchange centers and contained in an inner compartment of an electrolytic cell and separated by a first ion permeable diaphragm from a body of anolyte and separated by a second ion permeable diaphragm from a body of catholyte, and cyclically applying potential between an anode arranged in contact with said body of anolyte and first and second cathodes respectively arranged in contact with said body of catholyte and in contact with the water in said inner compartment, wherein in each cycle potential is applied between said first anode and said first cathode during a first time interval nonconcurrently with the application of potential between said anode and said second cathode and potential is applied between said anode and said second cathode during a second time interval either nonconcurrently or concurrently with the application of potential between said anode and said first cathode, whereby during said first time interval there are effected substantial displacements both of sorbed anions from said bed into said body of anolyte and of sorbed cations from said bed into said body of catholyte, and whereby during said second time interval there is effected substantial displacement only of sorbed anions from said bed into said body of anolyte, said displacements of sorbed anions and sorbed cations from said bed effecting corresponding anion regeneration and cation regeneration of said bed.

16. The method set forth in claim 15, wherein during said first time interval the rate of displacement of sorbed cations from said bed is substantially higher than the rate of displacement of sorbed anions from said bed, and wherein said first and second time intervals are so related that during each cycle the total displacements of sorbed anions and sorbed cations from said bed are substantially equivalent in order to effect substantially equivalent anion regeneration and cation regeneration of said bed.

17. The method of demineralizing raw water containing dissolved metal salts, comprising passing the raw water through a bed of ion exchange material including both anion exchange centers and cation exchange centers and contained in a inner compartment of an electrolytic cell and separated by a first ion permeable diaphragm from a body of anolyte and separated by a second ion permeable diaphragm from a body of catholyte, continuously applying potential between an anode arranged in contact with said body of anolyte and a first cathode arranged in contact with said body of catholyte, and selectively applying potential between said anode and a second cathode arranged in contact with the water in said inner compartment, whereby the application of potential btween said anode and said first cathode nonconcurrently with the application of potential between said anode and said second cathode effects substantial displacements both of sorbed anions from said bed into said body of anolyte and of sorbed cations from said bed into said body of catholyte, and whereby the application of potential between said anode and said second cathode concurrently with the application of potential between said anode and said first cathode effects substantial displacement only of sorbed anions from said bed into said body of anolyte, said displacements of sorbed anions and sorbed cations from said bed effecting corresponding anion regeneration and cation regeneration of said bed.

18. The method of demineralizing raw water containing dissolved metal salts, comprising passing the raw water through a bed of ion exchange material including both anion exchange centers and cation exchange centers and contained in an inner compartment of an electrolytic cell and separated by a first ion permeable diaphragm from a body of anolyte and separated by a second ion permeable diaphragm from a body of catholyte, and alternately applying potential between an anode arranged in contact with said body of anolyte and first and second cathodes respectively arranged in contact with said body of catholyte and in contact with the water in said inner compartment, whereby the application of potential between said anode and said first cathode effects substantial displacements both of sorbed anions from said bed into said body of anolyte and of sorbed cations from said bed into said bed of catholytes, and whereby the application of potential between said anode and said second cathode effects substantial displacement only of sorbed anions from said bed into said body of anolyte, said displacements of sorbed anions and sorbed cations from said bed effecting corresponding anion regeneration and cation regeneration of said bed.

19. The method of demineralizing raw water containing dissolved metal salts, comprising passing the raw water through a bed of ion exchange material including both anion exchange centers and cation exchange centers and contained in an inner compartment of an electrolytic cell and separated by a first ion permeable diaphragm from a body of anolyte and separated by a second ion permeable diaphragm from a body of catholyte, continuously applying a relatively high potential between an anode arranged in contact with said body of anolyte and a first cathode arranged in contact with said body of catholyte, and continuously applying a relatively low potential between said anode and a second cathode arranged in contact with the water in said inner compartment, whereby the applications of said potentials effect both a substantial displacement of sorbed anions from said bed into said body of anolyte and a substantial displacement of sorbed cations from said bed into said body of catholyte, said displacement of sorbed anions from said bed effecting corresponding anion regeneration thereof at a first rate and said displacement of sorbed cations from said bed effecting corresponding cation regeneration thereof at a second rate, and wherein said first and second regeneration rates substantially match each other so as to maintain substantially equivalent anion regeneration and cation regeneration of said bed.

References Cited in the file of this patent

UNITED STATES PATENTS

| | | |
|---|---|---|
| 1,431,047 | Ruben | Oct. 3, 1922 |
| 2,535,035 | Briggs | Dec. 26, 1950 |
| 2,681,885 | Briggs | June 22, 1954 |
| 2,838,449 | Briggs | June 10, 1958 |
| 2,863,813 | Juda et al. | Dec. 9, 1958 |
| 2,906,684 | Stoddard | Sept. 29, 1959 |
| 2,997,430 | Foyn | Aug. 22, 1961 |